(12) United States Patent
Döebertin et al.

(10) Patent No.: US 7,520,468 B2
(45) Date of Patent: Apr. 21, 2009

(54) CHILDREN'S PLAY CONTAINER FOR TRANSPORTATION VEHICLES, IN PARTICULAR FOR PASSENGER AIRCRAFT

(75) Inventors: Oliver Döebertin, Hamburg (DE); Wilfried Sprenger, Büsum (DE); Ralph Sturm, Hamburg (DE)

(73) Assignee: Airbus Deutschland GmbH (DE)

( * ) Notice: Subject to any disclaimer, the term of this patent is extended or adjusted under 35 U.S.C. 154(b) by 292 days.

(21) Appl. No.: 11/220,251

(22) Filed: Sep. 6, 2005

(65) Prior Publication Data

US 2006/0058107 A1 Mar. 16, 2006

(51) Int. Cl.
*B64D 11/06* (2006.01)
(52) U.S. Cl. .................. 244/118.5; 244/118.6; 446/227
(58) Field of Classification Search ............. 244/118.5, 244/118.6, 1 R, 129.1; 446/71, 72, 75, 227; 105/329.1, 344
See application file for complete search history.

(56) References Cited

U.S. PATENT DOCUMENTS

| 4,343,464 | A | | 8/1982 | Dose |
| 5,429,432 | A | | 7/1995 | Johnson |
| 5,542,870 | A | * | 8/1996 | Westersund .................. 446/75 |
| 6,199,229 | B1 | * | 3/2001 | Wong ............................. 5/417 |
| 6,357,462 | B1 | * | 3/2002 | Laosunthara et al. .......... 135/96 |
| 6,408,463 | B1 | * | 6/2002 | Palacio ........................... 5/424 |
| 6,864,805 | B1 | * | 3/2005 | Gomez ....................... 340/945 |
| 7,108,226 | B2 | * | 9/2006 | Quan et al. ............... 244/118.6 |
| 7,237,749 | B2 | * | 7/2007 | Ritts et al. ................ 244/118.5 |
| 2003/0011970 | A1 | | 1/2003 | Zheng |

FOREIGN PATENT DOCUMENTS

| DE | 91 11 104 U1 | 1/1992 |
| DE | 199 01 825 A | 7/2000 |
| DE | 200 06 297 U1 | 5/2001 |
| DE | 102 59 122 A1 | 7/2004 |
| EP | 0 850 833 A2 | 7/1998 |
| EP | 0 993 848 A | 4/2000 |
| EP | 1 055 438 A | 11/2000 |
| EP | 1 106 502 A1 | 6/2001 |
| WO | WO-02/18207 A1 | 3/2002 |

OTHER PUBLICATIONS

Eschback, "Das Fliegende Kinderzimmer", Zeitschrift fur Gestaltung, edition Apr. 1996, pp. 46-47.

* cited by examiner

*Primary Examiner*—J. Woodrow Eldred
(74) *Attorney, Agent, or Firm*—Lerner, David, Littenberg, Krumholz & Mentlik, LLP

(57) ABSTRACT

A children's play container in the cabin area on the level of the passenger deck, which when folded away has dimensions compatible with aircraft fixtures. In its assembled state, at least one side wall may be folded outwards along the lower horizontal edge onto the floor to form part of a play area. The inside of the children's play container incorporates playing equipment and fixtures for child care, which are accessible by opening at least one side wall.

16 Claims, 3 Drawing Sheets

CHILDREN'S PLAY CONTAINER FOR TRANSPORTATION VEHICLES, IN PARTICULAR FOR PASSENGER AIRCRAFT

BACKGROUND OF THE INVENTION

The invention relates to a children's play container for transportation vehicles, in particular for passenger aircraft and the arrangement of a children's play container in a passenger aircraft.

In passenger aircraft it is especially problematical to occupy children without disturbing the other passengers in the passenger cabin. A particular problem is posed by small children between the age of 2 to 6 years since their natural instinct to play and move about cannot be satisfied within the restricting conditions of the conventional layout of present day cabins. Children are meant to sit quietly in the passenger seats and make use of toys such as colored pencils and drawing books, puzzle books, comics or be entertained by children's videos or audio cassettes. This does not accommodate the movement impulse of small children and the aisle of the plane is misused as a play area, thereby encumbering passage for other passengers or flight personnel. The present day cabin layout of one to two narrow longitudinal aisles and seat rows arranged in close succession means that passenger capacity is maximized, but no movement possibility whatsoever is offered for children outside the confines of the seat. Airline companies are well aware of this problem and first attempts to find a solution are known. In the magazine "Zeitschrift für Gestaltung", edition 4/1996, page 46, 47 under the heading "Das fliegende Kinderzimmer" ("The flying playroom"), a possible solution is presented in which a children's play area is shown in an airliner. The suggestion implies that such a facility may be established in the freight area below the cabin, from where access is provided, by transforming a standard freight container accordingly. The idea therein is that such a special children's play area be used by children to let off steam and to play as well as to rest. It is obvious from this solution that the children cannot be supervised by their parents, who are in the cabin above. A supervisor would probably have to be present below in the freight room. A further disadvantage of the proposed solution is that freight capacity is forfeited for pay load and that headroom is significantly limited for adults.

SUMMARY OF THE INVENTION

According to an exemplary embodiment of the present invention, by making multi-purpose use of the circulation space in the passage way area in the vicinity of the aircraft doors, unused space may be purposefully employed throughout the journey. By means of a play container, after phases of sitting quietly in their seats, children are able to satisfy their need to move about in a special children's play area, without disturbing other passengers or encumbering the passage or the work of the flight personnel in the aisles.

This exemplary embodiment may provide for possibilities to occupy children in a vehicle of transportation, which allow a certain freedom of movement, without disturbing the other passengers. Furthermore, such a children's play area may be arranged in a way that it can be easily supervised as well as being economical with regard to cabin layout without necessitating a significant loss in seating capacity.

It is possible to reduce the container to minimal size when not in use during take-off and landing of the aircraft, whereby all play equipment as well as all necessary components of the container may be stowed in a space-saving manner.

The play container may, by simple means, flexibly form a playing area which may be assembled modularly and made to meet the spatial dimensions available.

A rigid play container may be achieved which in its closed or folded state provides a case-like receptacle for the necessary components and play equipment and at the same time, when used as a play area, provides a soft cushioning for playing children.

The container may be implemented in order to separate the children's play area from the remaining passage way.

According to another exemplary embodiment, an arrangement of a children's play container in the passenger cabin of an aircraft according to the present invention is provided.

BRIEF DESCRIPTION OF THE DRAWINGS

Further details and advantages may be taken from the following description of exemplary embodiments of the present invention.

The drawings represent an exemplary embodiment of the present invention which is described in more detail in the following with reference to FIGS. 1 to 4. In the FIGS., the same reference numerals are used to designate to the same or corresponding elements.

DETAILED DESCRIPTION

Figure 1:
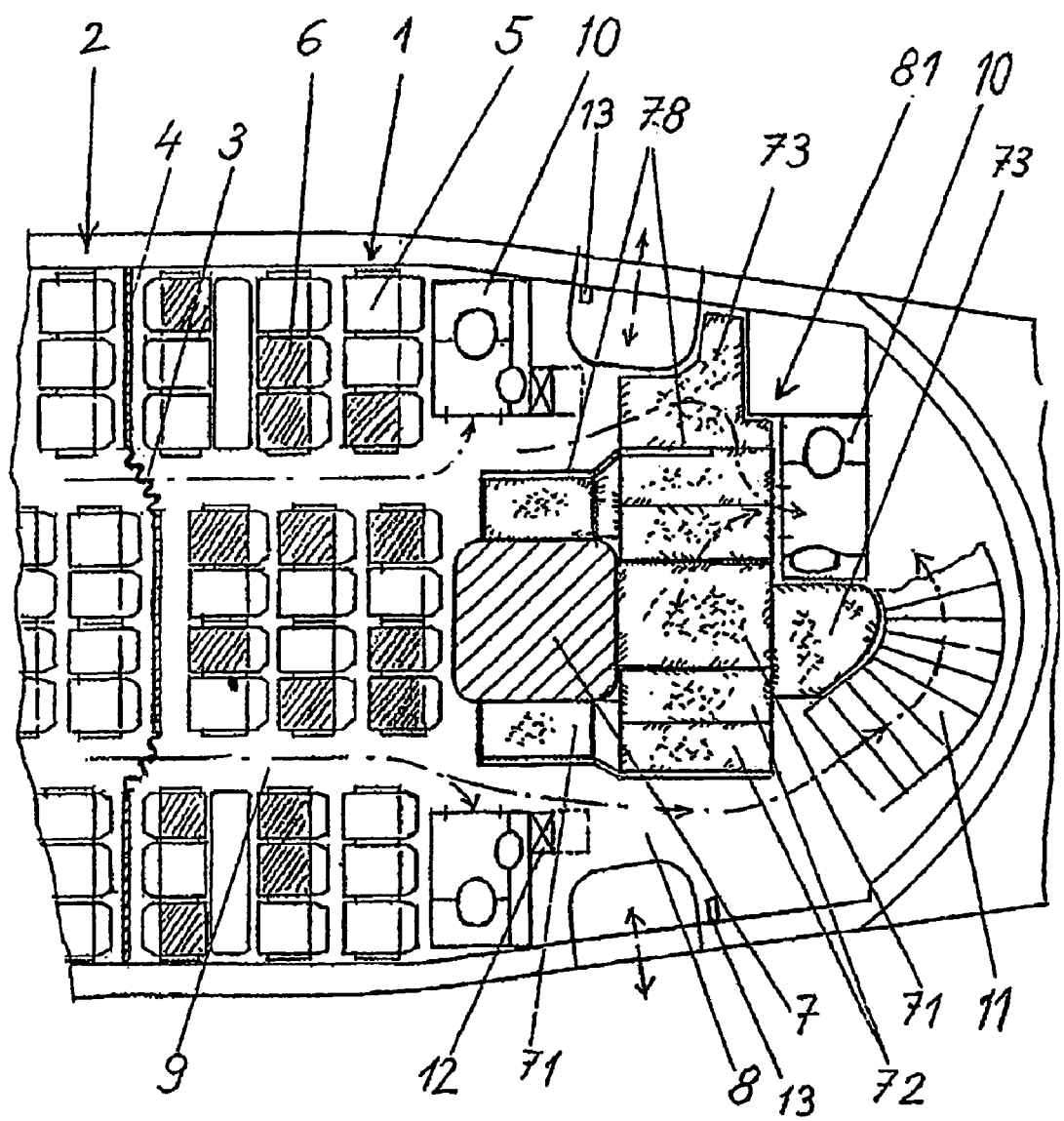
FIG. 1 shows a top view of a section of a cabin layout in the area of the rear of the aircraft.

FIG. 1 shows a cabin section of a passenger cabin 2 of a wide-bodied aircraft in which parents are accommodated with their children, i.e. a so-called parent/child area 1. The optical and acoustical division between the sections of the passenger cabin 2 is provided, for example, by a noise insulated door 3 and a dividing wall 4, as may be found, for example, between the different passenger class sections. For example, the noise insulated doors 3 may comprise curtains, bellow doors or sliding doors.

In the parent/child area 1, the conventional seating arrangement may be found in continuance of the seating in the respective cabin class section, for the protection of each passenger, especially during take-off, landing and in gusting winds. I.e. parent seats 5 are surrounded by child seats 6 (represented by the broken line), whilst passengers without children are accommodated in another cabin section 2. In the parent/child area 1, standard seats may be supplemented by baby baskets or booster seats as required in accordance with the size of the child. A modularly assembled children's play container 7 may be found in the passage way 8 (for example in the rear section of the cabin) of a wide-bodied aircraft. The children's play container 7 is preferably located in the area behind the center seats. The children's play container 7 is collapsed or folded away during take-off and landing of the aircraft as well as on the ground so that the function of the passage way 8 as a circulation and escape route can be absolutely guaranteed. During take-off and landing, the flight attendant seats may be used by the flight attendants. Once cruising altitude has been reached and the fasten seatbelts sign is extinguished, the individual side elements of the container 7 may be assembled, thus forming a separate play area 18 within the passage way 8, as may be taken from FIG. 1.

Use of the two longitudinal aisles 9 for access to the toilets 10, respectively to a rear stairway 11 remains unimpaired. The provision of a parent/child area 1 facilitates close parent/child contact, respectively uncomplicated supervision of children even at play or whilst moving around the play area 81. Swift intervention is ensured without necessitating a special supervising personnel. Child supervision may thereby be further improved by means of observation cameras 13 in the play area in connection with flat screen monitors in the backrests of parents' seats. According to an exemplary embodiment of the present invention, the children's play container 7 covers a spatial area of two bathroom/toilet units. The dimensions of the module are prescribed in accordance with the spatial dimensions of the passenger cabin of the aircraft 2, the height is approx. 210 cm, depth approx. 145 cm and the width may fluctuate between approx. 145 cm and 200 cm, depending on the number of center seats. In spite of the separation measures, such as noise insulated doors 3 and dividing walls 4, access to the toilets 10 may be guaranteed for persons in the passenger cabin 2.

Figure 2:
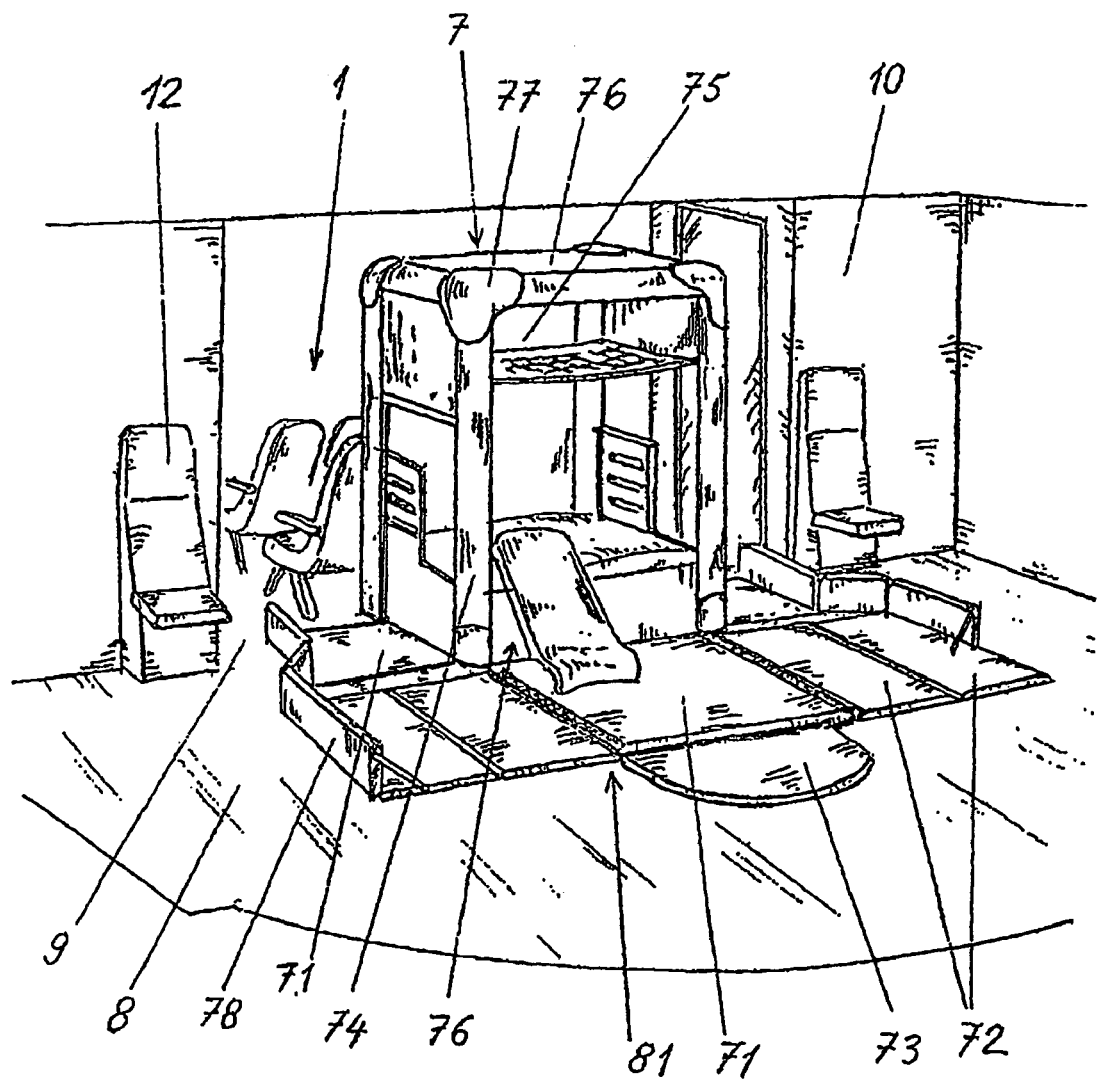
FIG. 2 shows an arrangement of a children's play container inside a passenger cabin of an aircraft.

FIG. 2 shows the children's play container 7 in a perspective view with the side elements opened out on the floor. The individual side elements are upholstered with padding on the inner side and form a play mat when opened out. A collapsible side wall 71 is opened out on the front side, allowing access to the children's play container 7. The collapsible side wall 71 is provided with padded folding elements 72 in order to thus form the largest possible continuous play area. In addition, supplementary elements 73, which may be stored within the container 7, may be attached by means of velcro fasteners on the outside of the elements 71, 72 and thus increase the play area. Collapsible elements 72 as well as supplementary elements 73 may be aligned as required and may vary depending on the cabin layout and the requirements for the play area. Passage way 8 outside the play area 81 is at the disposal of flight personnel, passengers/parents and children as a circulation area, likewise one flight attendant seat 12 continues to be accessible and may be used by a supervisory person, respectively a parent as well as by the flight personnel. In order to secure the boundary of the play area 81 from the passage way 8, side elements 71 and collapsible elements 72 are provided with several vertically extending side pieces 78. This further serves to guarantee that crawling/creeping babies remain inside the play area 81. The structural body of the shown children's play container 7 consists of four side posts 74, the mentioned collapsible side elements 71, a back wall 75 and covering and floor elements 76, whereby the outer dimensions are compatible with other modular aircraft fixtures, for example toilets. The side posts 74 are affixed to the other permanent structural parts by means of stable corner connections 77. Inside the container 7, in addition to the supplementary elements 73 already mentioned, there is various playing equipment, such as for example the children's slide or climbing elements shown in the Fig. Furthermore, relaxation facilities such as loungers or hammocks may be provided.

Figure 3:
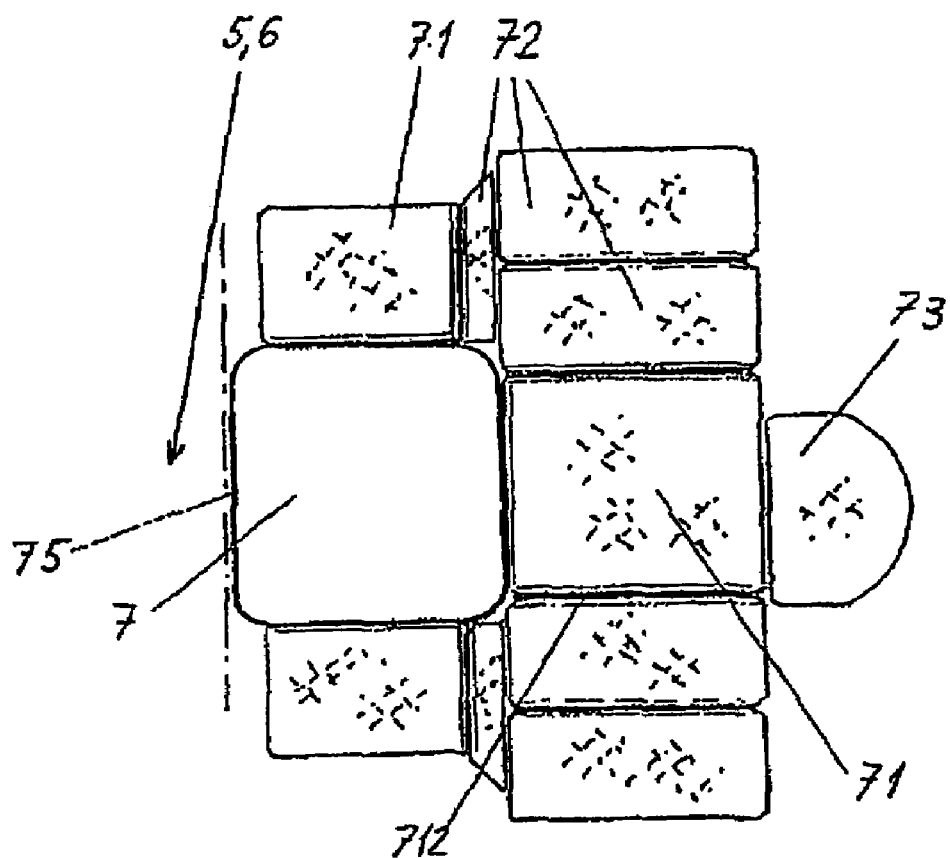
FIG. 3 shows a typical plan of a play container with the individual elements assembled.

FIG. 3 shows a typical plan view of the play container 7 with extended side elements 71, collapsible elements 72 and a supplementary element 73. Furthermore, it may be taken from the Fig. that three side elements 71 of the container 7 may be assembled and only the back wall is fixed, since this borders on the seating fixture 5, 6. It may also be taken from the Fig. that the dimensions of the collapsible elements 72 are specified such that in their folded state they fit into the side elements 71. If needed, further supplementary elements 73 of any shape may be aligned along the edge of the playing area 81 in order to increase its size.

Figure 4:
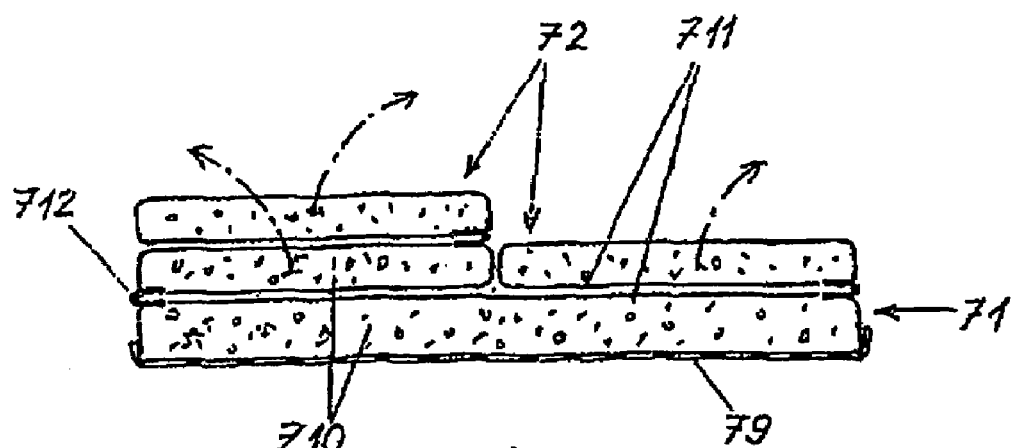
FIG. 4 shows a cross section through a side element of the container.

FIG. 4 shows a cross-section of collapsible side element 71 with collapsible elements 72. The outer wall 79 consists of tough, wipe resistant material (e.g. GFK). The actual play area is constructed to provide a cushioning, e.g. with an elastic foam filling 710 and a treated textile surface 711. The collapsible/folding elements 72 are all assembled in the same manner, except for the missing outer wall 79. In order to guarantee the collapsing function (represented by the arrows in the drawing), the individual elements are fastened together with textile tapes 712. Such tapes or velcro fasteners may also be provided to secure the collapsible elements 72 to the collapsible side wall 71.

As may be taken from FIGS. 1-4, according to an exemplary embodiment of the present invention, a container is provided which can be disassembled or folded for take-off, landing or any ground time. During the flight or when otherwise required, the container may be assembled or unfolded to form a children's play area. Advantageously, walls of the container which may be reached or touched by the children during play, are coated or padded with an elastic material. Preferably, the container is constituted by a plurality of wall elements which are flexibly or detachably attached to each other to allow for the folding and to allow the forming of the play area when the container is unfolded.

The container may comprise facilities for the children such as a changing table, playthings, toys or suitable stow areas for toys. In accordance with an exemplary embodiment of a seating arrangement for aircraft of the present invention, parents, flight attendants and or other people interested in the children or instructed to take care of the children may be seated in proximity to the location of the container.

The walls, bottom and top of the container may be formed of a light-weight material such as plastic. To provide for a sufficient structural strength, suitable reinforcements may be provided. The container may be attached to the aircraft or to fixtures of the aircraft. E.g., the container may be attached by using the seat belts of neighbouring seats. The container may be stowed on an empty seat for take off and landing and may attached to the seat by using the seat belts. For this, the form of the folded container may be adapted such that it may be stored on a seat or a seat row. Also, the unfolded, assembled container may be attached by using the seat belts of adjacent seats.

Advantageously, a flexible container or children's play area may be provided, which advantageously may be folded for transportation and may be unfolded for providing a 'playground'. During transportation, the outer dimensions are relatively small. Also, by using suitable materials of the container, it may be handled by one person only.

By using a plurality of wall elements for the container, e.g. 11 as in one of the above embodiments, a very flexible container may be provided which has small stowing dimensions.

REFERENCE NUMERALS

1 Parent/child area
2 Passenger cabin
3 Noise insulating door
4 Dividing wall
5 Parent/child seat
6 Child seat
7 Children's play container
71 Collapsible side wall
72 Collapsible element
73 Supplementary element
74 Side posts
75 Back wall 76 Covering element and floor element
77 Corner connection
78 Side piece
79 Outer wall
710 Elastic material
711 Textile surface, treated (or suchlike)
712 Textile tape
8 Passage way
81 Play area
9 Longitudinal aisle
10 Toilet
11 Stairs
12 Flight attendant seat
13 Observation camera

The invention claimed is:

1. A passenger aircraft comprising a children's play container, the passenger aircraft having aircraft fixtures and a passenger cabin with a passageway and with a parent/child area, the children's play container comprising:
   at least one structural side wall;
   a play area; and
   at least one of playing equipment and fixtures for child care;
   wherein the children's play container is foldable such that it has a folded state and an assembled state;
   wherein, in the folded state, dimensions of the children's play container are compatible with the aircraft fixtures;
   wherein, in the assembled state, the at least one structural side wall is foldable outwardly;
   wherein, when the at least one structural side wall is folded outwardly, the play area is formed; and
   wherein the at least one of playing equipment and fixtures for child care is arranged at an inside of the children's play container and is accessible when the at least one side wall is folded outwardly
   wherein the children's play container is adapted for being attached to at least one of the aircraft and fixtures of the aircraft in the parent/child area;
   wherein, in the assembled state, the children's play container is at least partly arranged in the passageway; and
   wherein, in the folded state of the children's play container, the passageway is usable as a circulation and escape route.

2. The passenger aircraft according to claim 1, wherein the at least one side wall further comprises a plurality of collapsible elements, which form a floor cushioning when folded outwards.

3. The passenger aircraft according to claim 2, wherein the at least one side wall and the collapsible elements comprise supplementary elements attached to their edges, whereby the individual elements are connected to each other with textile tapes or fasteners.

4. The passenger aircraft according to claim 1, wherein the at least one side wall comprises an outer wall made of a resistant material, and wherein the outer wall has an inner side, which is made of an elastic material and which is suitable to serve as a play mat.

5. The passenger aircraft according to claim 2, wherein at least one of the at least one side wall and the collapsible elements and at least a supplementary element is provided with vertically extending side pieces.

6. The passenger aircraft according to claim 1, further comprising:
   a structural arrangement comprising four side posts, a covering element, a floor element and collapsible/folding side walls.

7. The passenger aircraft according to claim 6, wherein the structural arrangement further comprises a back wall.

8. The passenger aircraft according to claim 1, wherein the children's play container has a square footprint.

9. The passenger aircraft according to claim 1, wherein the children's play container has a footprint other than a square footprint.

10. The passenger aircraft according to claim 1, wherein the passenger aircraft includes a passenger cabin, seating, aisles, and the passageway to entrance and exit doors of the aircraft, and wherein the children's play container is arranged behind a last row of the seating bordering on the passageway and forms a play area on a disposable area of the passageway during the flight and requires a minimal space when folded-up during take-off and landing.

11. The passenger aircraft according to claim 10, wherein a parent/child area with parent seating and child seating is provided as part of aircraft seating regulations directly bordering on the location of the children's play container.

12. The passenger aircraft according to claim 11, wherein the parent/child area is separable from the remaining passenger cabin area by at least one a of dividing wall and a noise insulating door.

13. The passenger aircraft according to claim 10, wherein at least one flight attendant seat is provided in the area of the passageway bordering on the children's play container.

14. The passenger aircraft according to claim 10, wherein one or more observation cameras are provided to monitor the play area.

15. The passenger aircraft of claim 1, wherein the parent/child area is located in the rear section of the cabin.

16. The passenger aircraft of claim 1, wherein the parent/child area is divided from another cabin section of the passenger cabin by at least one of a dividing wall and a noise insulating door.

* * * * *

UNITED STATES PATENT AND TRADEMARK OFFICE
CERTIFICATE OF CORRECTION

PATENT NO. : 7,520,468 B2
APPLICATION NO. : 11/220251
DATED : April 21, 2009
INVENTOR(S) : Oliver Döebertin, Wilfried Sprenger and Ralph Sturm It is certified that error appears in the above-identified patent and that said Letters Patent is hereby corrected as shown below:

On the Title Pg. above Item (56) "References Cited" insert --"DOMESTIC PRIORITY CLAIM – (Continuation of PCT EP04/02364) and FOREIGN APPLICATION – GERMANY 103 09 980.8 – (3/7/03)--.

Col. 1, Line 50 "passage way" should read --passageway--.

Col. 2, Line 10 "passage way" should read --passageway--.

Col. 2, Line 23 delete "to" after --designate--.

Col. 2, Line 55 "passage way" should read --passageway--.

Col. 2, Line 61 "passage way" should read --passageway--.

Col. 2, Line 67 "passage way" should read --passageway--.

Col. 3, Line 6 delete "a" after --necessitating--.

Col. 3, Line 36 "passage way" should read --passageway--.

Col. 3, Line 42 "passage way" should read --passageway--.

Col. 3, Line 55 replace "Fig." with --Figure--.

Col. 3, Line 60 replace "Fig." with --Figure--.

Col. 3, Line 63 replace "Fig." with --Figure--.

Col. 4, Line 19 insert --,-- after --container--.

Col. 4, Line 38 "may" should read --maybe--.

Col. 5, Line 8 "passage way" should read --passageway--.

CERTIFICATE OF CORRECTION (continued)
U.S. Pat. No. 7,520,468 B2

Col. 6, Line 37 "one a of" should read --one of a--.

Signed and Sealed this

Twenty-third Day of February, 2010

David J. Kappos
*Director of the United States Patent and Trademark Office*